Sept. 4, 1951  A. A. BERESTNEFF  2,566,480
DUAL TEMPERATURE ABSORPTION REFRIGERATION SYSTEM
Filed March 6, 1947  2 Sheets-Sheet 1
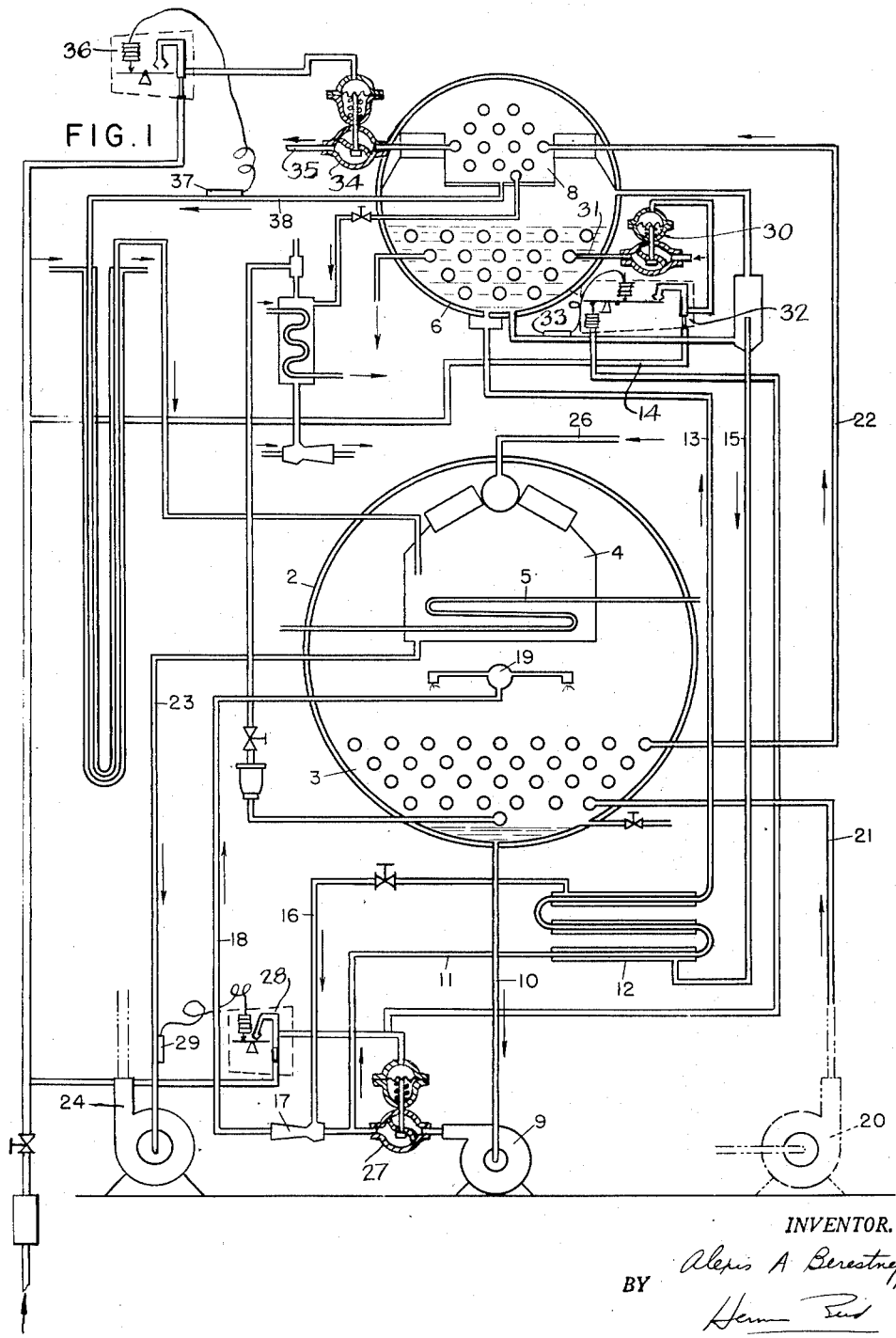
INVENTOR.
Alexis A Berestneff
BY Sept. 4, 1951 A. A. BERESTNEFF 2,566,480
DUAL TEMPERATURE ABSORPTION REFRIGERATION SYSTEM
Filed March 6, 1947 2 Sheets-Sheet 2
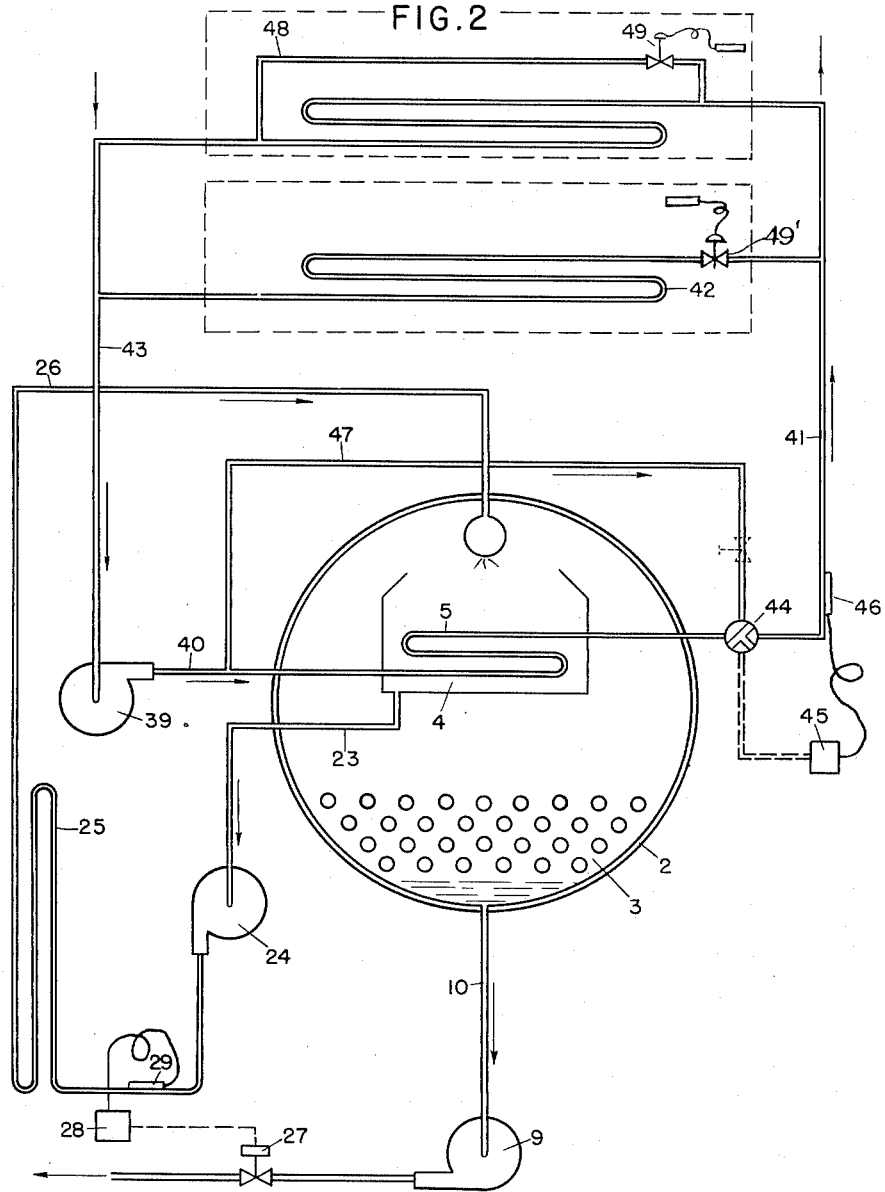
INVENTOR.
Alexis A Berestneff
BY Patented Sept. 4, 1951

2,566,480

UNITED STATES PATENT OFFICE 2,566,480

DUAL TEMPERATURE ABSORPTION REFRIGERATION SYSTEM

Alexis A. Berestneff, Syracuse, N. Y., assignor to Carrier Corporation, Syracuse, N. Y., a corporation of Delaware Application March 6, 1947, Serial No. 732,751

9 Claims. (Cl. 62—5)

This invention relates to an absorption refrigeration system, and more particularly, to an absorption refrigeration system adapted to provide conditioning fluids at different temperatures to a plurality of heat exchangers to be disposed in heat exchange relation with mediums to be conditioned.

In the co-pending application of Alexis A. Berestneff, Serial No. 683,387, filed July 13, 1946, and in the co-pending application of Alexis A. Berestneff and William L. McGrath, Serial No. 683,390, filed July 13, 1946, there are disclosed an absorption refrigeration system and a control arrangement therefor which may be readily modified to provide dual temperatures. While the present invention is not limited to its use in connection with the absorption refrigeration system described in such co-pending applications, above referred to, but may be embodied in other types of absorption refrigeration systems, it will be understood that it is preferred to employ the present invention in connection with an absorption refrigeration system of the type described in such co-pending applications.

The chief object of the present invention is to provide an absorption refrigeration system capable of providing conditioning mediums at different temperatures in which the temperatures of the mediums so provided may be controlled independently of one another.

An object of the present invention is to provide an absorption refrigeration system in which the refrigerant is flash-cooled in the evaporator of the system, the cooled refrigerant being disposed in heat exchange relation with a conditioning medium to be cooled, the cooled refrigerant then passing to a primary heat exchanger to be disposed in heat exchange relation with primary air to be conditioned and the cooled conditioning medium passing to a secondary heat exchanger to be disposed in heat exchange relation with secondary air in an area to be conditioned.

A further object is to provide a single absorption refrigeration machine capable of providing chilled water at different temperatures.

A still further object is to provide an absorption refrigeration machine including a coil disposed in the evaporator, conditioning medium being circulated through said coil in heat exchange relation with cooled refrigerant in the evaporator and then passing to a secondary heat exchanger disposed in an area to be conditioned to be placed in heat exchange relation with air in such area; the cooled refrigerant is circulated through a primary heat exchanger disposed at a central station in heat exchange relation with air to be conditioned and is then returned to the evaporator of the absorption system, being flash-cooled in the evaporator to the desired temperature. Other objects of my invention will be readily perceived from the following description.

This invention relates to an absorption refrigeration system which includes an absorber, an evaporator, a generator, and a condenser disposed in a closed circuit. Means are provided for withdrawing solution from the generator and for forwarding the solution to the absorber as well as for circulating solution from the absorber to the generator. Refrigerant is forwarded to the evaporator, the flashed vapor passing downward to the absorber to be absorbed by the solution therein; in the generator, substantially the same amount of vapor is boiled out, is condensed, and passed to the chilled water circuit. Suitable control members are provided for regulating the temperature of chilled refrigerant, solution flow, the amount of steam passing through the tubes of the generator and the amount of condensing water passing through the tubes of the absorber and the condenser. Within the evaporator is disposed a heat exchange member such as a coil of any suitable type; conditioning medium to be cooled is circulated through such coil in heat exchange relation with cooled refrigerant in the evaporator and is then passed through a secondary heat exchanger disposed in an area to be conditioned in heat exchange relation with air in such area and is then returned to the absorption system and again passed through the coil in the evaporator. Suitable means are provided to bypass a portion of the conditioning medium returning to the evaporator coil in order to maintain a desired temperature of conditioning medium passing to the secondary heat exchanger.

The attached drawings illustrate a preferred embodiment of the invention, in which Figure 1 is a diagrammatical view illustrating the operation of the absorption refrigeration system; and Figure 2 is a fragmentary diagrammatical view of the absorption system illustrating the manner in which dual temperatures are obtained.

Referring to the drawings, there is shown a horizontally extending shell 2 having an absorber 3 disposed at the bottom thereof and an evaporator 4 disposed in the upper portion of the shell; a heat exchange member, such as a coil 5, is disposed in evaporator 4, as hereinafter explained.

A second shell 6 includes a generator 7 disposed at the bottom thereof and a condenser 8 disposed in the upper portion of shell 6. Weak solution is withdrawn from absorber 3 by pump 9 through line 10 and is forwarded to generator 7 through line 11, heat exchanger 12, and line 13. Strong solution is withdrawn from generator 7 through line 14, line 15, heat exchanger 12, line 16 to ejector 17 which forwards strong solution through line 18 to spray arrangement 19 adapted to spray the solution over the tubes of of absorber 3.

A pump 20 passes cooling or condensing water through line 21 to the tubes of absorber 3. Cooling water after its pasage through the tubes of absorber 3 is directed through line 22 to the tubes of condenser 8.

Chilled water leaves evaporator 4 through line 23 and is circulated by pump 24 through a primary heat exchanger 25 disposed preferably in a central station air conditioning system and is adapted to condition air passing through the central station. Cooled water after its passage through heat exchanger 25 is returned through line 26 to evaporator 4 and is flash-cooled in the evaporator to attain the required temperature, the cooled water or refrigerant passing in heat exchange relation with coil 5 and again being circulated through primary heat exchanger 25.

Suitable controls are provided to regulate the operation of the system. Valve 27 controlled by thermostat 28 actuated in response to a bulb 29 disposed in or in contact with line 23 regulates the flow of solution through the system. Valve 30 disposed in steam line 31 and controlled by thermostat 32 actuated by bulb 33 disposed in or adjacent line 14 regulates the quantity of steam passing through the tubes of generator 7. Valve 34, disposed in condensing water line 35, controlled by thermostat 36 actuated by means of a bulb 37 disposed in or in contact with condensate line 38 regulates the flow of cooling or condensing water through the tubes of the absorber 3 and condenser 8. Suitable means are provided, of course, to purge the absorber and condenser of non-condensible gases and to return condensate from condenser 8 to evaporator 4.

The absorption refrigeration system so described is disclosed and claimed in the co-pending applications above referred to and reference is made to such applications for a more complete description of the arrangement and the manner in which such system functions. The present invention is concerned primarily with an improvement in such system whereby the system may function to provide dual temperatures of conditioning medium.

Referring to Figure 2, there is illustrated suitable means for providing dual temperatures from a single absorption refrigeration machine of the type described. Conditioning medium is circulated by pump 39 through line 40 to coil 5 disposed in evaporator 4; flash-cooled refrigerant in evaporator 4 is disposed in heat exchange relation with coil 5 and serves to cool conditioning medium passing therethrough. Line 41 connects coil 5 with a plurality of secondary heat exchangers 42 disposed in areas to be conditioned. Such secondary heat exchangers 42 may comprise a portion of an air conditioning system such as is described in Carrier Patent No. 2,363,294, granted November 21, 1944, in which air from the area being conditioned is induced into an induction unit disposed in the area by the discharge of primary conditioned air at high velocity in the unit. The induced air passes through secondary heat exchanger 42 and is cooled to a desired temperature in accordance with the requirements of the individual area being conditioned.

Conditioning medium after passage through secondary heat exchangers 42 is returned through line 43 to pump 39 and is again passed through coil 5 and again cooled.

It will be appreciated in most cases it is desirable that cooled refrigerant passing to primary heat exchanger 25 be at a different temperature than conditioning medium passing to secondary heat exchangers 42. Refrigerant is flash-cooled in evaporator 4 to a desired temperature and, passing in heat exchange relation with coil 5, cools conditioning medium therein to substantially the same temperature. A three-way mixing valve 44 is disposed in line 41 to regulate the flow of conditioning medium therethrough. Valve 44 is controlled by a thermostat 45 which is actuated by a bulb 46 disposed in or in contact with line 41. A bypass 47 connects line 40 with valve 44. Assume it is desired to maintain conditioning medium passing to secondary heat exchangers 42 at a temperature of 50° F., bulb 50 in response to the temperature of conditioning medium in line 41 actuates thermostat 45 to control valve 44 to regulate the quantity of conditioning medium passing through coil 5 and through bypass 47. In other words, a portion of conditioning medium returning from secondary heat exchangers 42 is cooled while a second portion is not changed in temperature, the proportions of the two streams of conditioning medium being regulated to attain a desired final temperature of conditioning medium for supply to the secondary heat exchangers.

In order to regulate the quantity of conditioning medium passing through each secondary heat exchanger 42, a suitable bypass 48 is provided extending from line 41 to line 43. A valve 49 is disposed in bypass 48; valve 49 may be regulated in response to the temperature of the area being conditioned to determine the quantity of cooled conditioning medium passing through each heat exchanger 42 in accordance with the requirements of each individual area. If desired, bypass 48 and valve 49 may be eliminated, a suitable throttling valve 49', for example, the valve disclosed in Carrier Reissue Patent No. 22,685, granted October 30, 1945, being placed in line 41 and serving to throttle the flow of conditioning medium to a heat exchanger 42 in accordance with the requirements of the area in which it is disposed.

In operation, the absorption refrigeration system functions to provide chilled water at a predetermined temperature, such chilled water being circulated through a primary heat exchanger 25 in heat exchange relation with air to be conditioned. After passage through heat exchanger 25, the chilled water is returned to evaporator 4 and is flash-cooled in evaporator 4 to a predetermined temperature. The cooled water or other refrigerant in evaporator 4 passes in heat exchange relation with conditioning medium flowing through coil 5 in evaporator 4 and serves to cool such medium to a desired temperature, again being withdrawn from the evaporator 4 by pump 24 and circulated through primary heat exchanger 25.

Cooled conditioning medium is directed through coil 5 by pump 39, being cooled during such passage by the flash-cooled refrigerant in the evaporator. It is desired to maintain a predetermined temperature of conditioning medium supplied to the secondary heat exchangers 42. For this purpose, valve 44, disposed in line 41, is actuated to regulate the proportions of conditioning medium directed through coil 5 to be cooled and the proportions of conditioning medium bypassing coil 5. Such streams of conditioning medium at different temperatures are mixed automatically to provide conditioning medium at a desired temperature for supply to secondary heat exchangers 42. After passage of conditioning medium through secondary heat exchangers 42, pump 39 again supplies such medium to be cooled in evaporator 4.

The above description contemplates operation of the system at substantially full load to provide conditioning medium to heat exchangers 42. It will be appreciated frequently, under certain conditions of operation, as large a supply of medium at a temperature of say 50° F. is not required. At substantially full load, it is contemplated that medium returning from exchangers 42 will be raised in temperature to say 60° F. Suppose, for example, the load decreases so that medium returning to coil 5 is at a temperature of say 55° F. Under these circumstances, the M. E. D. between the temperature of the conditioning medium and the chilled refrigerant decreases, the bypass 41 is opened to a greater extent and the velocity of medium through coil 5 is reduced thus reducing the rate of heat transfer to provide medium at the desired temperature under conditions of partial load. When the load imposed upon the system at primary heat exchanger 25 decreases, the absorption machine then operates under partial load conditions as explained in the co-pending applications above referred to.

It will be observed that I am able to provide cooled refrigerant, such as chilled water, at a predetermined temperature for passage through a primary heat exchanger while I am also able to provide conditioning medium, such as chilled water, at a different temperature for passage through a plurality of secondary heat exchangers and to control the temperatures so obtained independently of one another. The temperatures of the two mediums may be varied as desired in order to supply the mediums at desired temperatures to the primary and secondary heat exchangers.

The present invention provides a single absorption refrigeration machine capable of supplying conditioning medium to different places of use at different temperatures. The absorption system provided is inexpensive in initial cost and in operation; the equipment required to provide conditioning mediums at different temperatures does not increase the cost of the machine to a great extent and may be readily incorporated in the system at the place of manufacture.

While I have described a preferred embodiment of my invention, it will be understood my invention is not limited thereto since it may be otherwise embodied within the scope of the following claims.

I claim:

1. In an absorption refrigeration system, the combination of a generator, a condenser, an absorber, and an evaporator having a pool of cooled refrigerant therein, means for controlling operation of said system, a primary heat exchanger, means for circulating cooled refrigerant from the evaporator to the primary heat exchanger, a heat exchange member in said evaporator placed in said pool of cooled refrigerant and adapted to dispose conditioning medium in heat exchange relation with the cooled refrigerant in said evaporator, a secondary heat exchanger, and means for supplying the cooled conditioning medium to the secondary heat exchanger.

2. An absorption refrigeration system according to claim 1 in which means are provided for controlling the temperature of the refrigerant circulated to the primary heat exchanger and means are provided for controlling the temperature of the conditioning medium circulated to the secondary heat exchanger independently of said first means.

3. In a system of the character described, the combination of a generator, a condenser, an absorber, and an evaporator disposed in a closed circuit, refrigerant being flash-cooled in said evaporator, said evaporator having a pool of cooled refrigerant therein, a primary heat exchanger adapted to cool air at a central station, means for circulating cooled refrigerant from the evaporator to the primary heat exchanger, a heat exchange member in said evaporator placed in said pool of cooled refrigerant and adapted to dispose conditioning medium in heat exchange relation with the cooled refrigerant, a secondary heat exchanger disposed in an area to be conditioned and adapted to cool air in such area, and means for passing conditioning medium through said member in said evaporator and for supplying the cooled conditioning medium to the secondary heat exchanger.

4. In a system of the character described, the combination of a generator, a condenser, an absorber, and an evaporator disposed in a closed circuit, refrigerant being flash-cooled in said evaporator, said evaporator having a pool of cooled refrigerant therein, a heat exchange member in said evaporator in said pool of cooled refrigerant and adapted to dispose first conditioning medium in heat exchange relation with cooled refrigerant, means for circulating cooled refrigerant from the evaporator in heat exchange relation with a second medium to be cooled, and means for circulating cooled first conditioning medium at a temperature different than the temperature of the cooled refrigerant in heat exchange relation with a third medium to be cooled.

5. In an absorption refrigeration system, the combination of a generator, a condenser, an absorber, and an evaporator disposed in a closed circuit, means for controlling operation of said system, refrigerant in the evaporator being flash-cooled, means for circulating cooled refrigerant from the evaporator through a primary heat exchanger, a heat exchange member disposed in the evaporator adapted to dispose conditioning medium in heat exchange relation with cooled refrigerant therein, means for passing conditioning medium through said member and for supplying the cooled medium to a secondary heat exchanger disposed in an area to be conditioned, means for bypassing conditioning medium about said heat exchange member, and means for regulating the proportion of conditioning medium passing through said heat exchanger.

6. A system according to claim 5 in which said regulating means comprise a valve disposed in the path of the conditioning medium, a control member for regulating said valve and means for actuating said control member in response to the temperature of conditioning medium passing to the secondary heat exchanger.

7. A system according to claim 5 in which said bypass means comprise a bypass connecting the return line and the supply line and in which the regulating means include a valve disposed in the supply line, said valve regulating the proportion of conditioning medium passing through the heat exchange member and the bypass in response to the temperature of conditioning medium passing to the secondary heat exchanger.

8. In a system of the character described, the combination of a generator, a condenser, an absorber, and an evaporator disposed in a closed circuit, refrigerant in said evaporator being flash-cooled, means for circulating solution through the system, means for regulating operation of the system, a pump for circulating cooled refrigerant passing through a primary heat exchanger, a heat exchange member disposed in the evaporator, a supply line connecting said member with a secondary heat exchanger, a return line connecting the secondary heat exchanger and said member, a pump in said return line for circulating conditioning medium through said member, in heat exchange relation with cooled refrigerant in said evaporator and for passing the cooled conditioning medium through the secondary heat exchanger, a bypass line connecting the supply and return lines, a valve disposed at the juncture of the bypass and return lines for regulating the quantity of conditioning medium passing through said member, and a control member for regulating the valve in response to temperature of conditioning medium passing to the secondary heat exchanger.

9. A system according to claim 8 in which a bypass extends about the secondary heat exchanger and connects the supply and return lines, and a valve is disposed in said bypass to regulate the quantity of conditioning medium passing through the secondary heat exchanger in accordance with the temperature of the area in which said exchanger is disposed.

ALEXIS A. BERESTNEFF.

REFERENCES CITED

The following references are of record in the file of this patent:

UNITED STATES PATENTS

| Number | Name | Date |
| --- | --- | --- |
| 1,798,951 | Munters | Mar. 31, 1931 |
| 2,301,939 | Fator | Nov. 17, 1942 |
| 2,317,283 | Lynger | Apr. 20, 1943 |
| 2,345,651 | Bichowsky | Apr. 4, 1944 |